US011915847B2

(12) United States Patent
Nakazawa et al.

(10) Patent No.: US 11,915,847 B2
(45) Date of Patent: Feb. 27, 2024

(54) DUST CORE

(71) Applicant: TDK CORPORATION, Tokyo (JP)

(72) Inventors: Ryoma Nakazawa, Tokyo (JP); Takeshi Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 138 days.

(21) Appl. No.: 15/915,852

(22) Filed: Mar. 8, 2018

(65) Prior Publication Data

US 2018/0261385 A1 Sep. 13, 2018

(30) Foreign Application Priority Data

Mar. 9, 2017 (JP) ................................ 2017-045481
Feb. 28, 2018 (JP) ................................ 2018-035650

(51) Int. Cl.

| | |
|---|---|
| ***H01F 1/26*** | (2006.01) |
| ***H01F 41/02*** | (2006.01) |
| ***H01F 27/255*** | (2006.01) |
| ***H01F 1/24*** | (2006.01) |
| ***H01F 3/08*** | (2006.01) |
| ***H01F 1/33*** | (2006.01) |
| ***B22F 1/10*** | (2022.01) |
| ***B22F 1/16*** | (2022.01) |
| ***B22F 1/052*** | (2022.01) |

(52) U.S. Cl.

CPC .................. *H01F 1/26* (2013.01); *B22F 1/10* (2022.01); *B22F 1/16* (2022.01); *H01F 1/24* (2013.01); *H01F 1/33* (2013.01); *H01F 3/08* (2013.01); *H01F 27/255* (2013.01); *H01F 41/0246* (2013.01); *B22F 1/052* (2022.01); *B22F 2304/054* (2013.01); *B22F 2304/056* (2013.01); *B22F 2304/10* (2013.01)

(58) Field of Classification Search

CPC ...... H01F 27/255; H01F 3/08; H01F 1/14783; H01F 1/14793; H01F 1/15358–15366; H01F 1/24; H01F 1/28; H01F 1/36–37; H01F 1/38; H01F 1/33

See application file for complete search history.

(56) References Cited

U.S. PATENT DOCUMENTS

2008/0231409 A1* 9/2008 Kugai ...................... H01F 1/24 336/233
2009/0226751 A1* 9/2009 Mitani ...................... H01F 1/26 428/552

(Continued)

FOREIGN PATENT DOCUMENTS

EP 2226142 A1 * 9/2010 ............... B22F 1/02
JP 2003282317 A * 10/2003

(Continued)

OTHER PUBLICATIONS

Shiffler R., Harsha P.; "Upper and Lower Bounds for the Sample Standard Deviation", Teaching Statistics, (1980), vol. 2, Issue 3, 84-86 (Year: 2014).*

(Continued)

*Primary Examiner* — Alexandra M Moore
*Assistant Examiner* — Austin Pollock
(74) *Attorney, Agent, or Firm* — Oliff PLC

(57) ABSTRACT

A dust core includes a metal magnetic material and a resin. Fine particles exist on a surface of the dust core.

8 Claims, 4 Drawing Sheets

(56) References Cited

U.S. PATENT DOCUMENTS

| | | | | |
|---|---|---|---|---|
| 2010/0044618 | A1* | 2/2010 | Ishimine | H01F 41/0246 252/62.55 |
| 2010/0045120 | A1* | 2/2010 | Kitano | H02K 1/02 310/44 |
| 2013/0056674 | A1* | 3/2013 | Inagaki | H01F 41/0246 252/62.55 |
| 2013/0057371 | A1* | 3/2013 | Shimoyama | B22F 1/0062 335/297 |
| 2013/0342069 | A1* | 12/2013 | Rowe | C04B 35/62807 310/216.066 |
| 2014/0232507 | A1* | 8/2014 | Nishio | B22F 1/02 336/233 |
| 2016/0125987 | A1* | 5/2016 | Moon | H01F 1/26 252/62.54 |
| 2018/0315528 | A1* | 11/2018 | Nanbara | C22C 38/02 |

FOREIGN PATENT DOCUMENTS

| | | | | | |
|---|---|---|---|---|---|
| JP | 2005-129716 | A | | 5/2005 | |
| JP | 2005129716 | A | * | 5/2005 | |
| JP | 2005217289 | A | * | 8/2005 | H01F 1/24 |
| JP | 2005243769 | A | * | 9/2005 | |
| JP | 2006128521 | A | * | 5/2006 | |
| JP | 2009-120915 | A | | 6/2009 | |
| JP | 2009-158652 | A | | 7/2009 | |
| JP | 2009231481 | A | * | 10/2009 | |
| JP | 2009259939 | A | * | 11/2009 | |
| JP | 2009302165 | A | * | 12/2009 | |
| JP | 2010-62424 | A | | 3/2010 | |
| JP | 2011035004 | A | * | 2/2011 | |
| JP | 2011063824 | A | * | 3/2011 | |
| JP | 2011-233860 | A | | 11/2011 | |
| JP | 5190331 | B2 | | 4/2013 | |
| JP | 2013243268 | A | * | 12/2013 | |
| JP | 2016035959 | A | * | 3/2016 | |
| WO | WO-2012146967 | A1 | * | 11/2012 | B22F 1/02 |

OTHER PUBLICATIONS

Croucher J., "An Upper Bound on the Value of the Standard Deviation", Teaching Statistics, vol. 25, No. 2 (Year: 2004).*

Nanocomposix; "Silica Nanoparticles"; Jan. 2, 2016; retrieved from internet Nov. 12, 2021; https://web.archive.org/web/20160102131935/http://nanocomposix.com/collections/silica (Year: 2016).*

* cited by examiner

DUST CORE

BACKGROUND OF THE INVENTION

1. Field of the Invention

The present invention relates to a dust core.

2. Description of the Related Art

Motors and coil devices, such as inductors, choke coils, and transformers, have been required to be downsized, and widely used is thereby a metal magnetic material whose saturation magnetic flux density is larger than that of ferrite and whose DC superposition characteristics are maintained until high magnetic field. Dust cores thereof are expected to be used in various environments and are thereby desired to have improved reliabilities.

Among the reliabilities, corrosion resistance is particularly desired to be improved. This is because most of dust cores currently used comprise Fe based alloy particles.

Patent Document 1 discloses that corrosion resistance is improved by containing Cr as a metal magnetic material, but if Cr must be contained, the range of material selection is narrowed.

Patent Document 2 discloses that a metal magnetic material is coated with inorganic coat (phosphate), but phosphate has low toughness, and a coating film may be broken when molding pressure is increased.

Patent Document 3 discloses that corrosion resistance is improved by coating a magnetic product with ceramics and resin, but the method of Patent Document 3 requires a dust core to be heated at a high temperature of 800° C. or more. If the dust core includes an insulated copper wire or so, the insulation of the wire may be broken.

Patent Document 1: JP2010062424 (A)

Patent Document 2: JP2009120915 (A)

Patent Document 3: JP5190331 (B2)

SUMMARY OF THE INVENTION

The present invention has been achieved under such circumstances. It is an object of the invention to provide a dust core excelling in corrosion resistance.

To achieve the above object, the dust core according to the present invention comprises a metal magnetic material and a resin, wherein fine particles exist on a surface of the dust core.

The dust core according to the present invention has the above features, and is thereby excellent in corrosion resistance.

Preferably, the fine particles on the surface of the dust core have an average particle size of 1.0 to 200 nm.

Preferably, particle sizes of the fine particles on the surface of the dust core have a standard deviation σ of 30 nm or less.

Preferably, the fine particles comprise a Si—O based compound.

Preferably, the fine particles are attached to the metal magnetic material.

Preferably, the metal magnetic material comprises a main component of Fe.

Preferably, the metal magnetic material comprises a main component of Fe and Si.

Preferably, an oxide film comprising a Si—O based oxide exists on a surface of the metal magnetic material.

DETAILED DESCRIPTION OF THE PREFERRED EMBODIMENT

Hereinafter, an embodiment of the present invention is described based on figures.

A dust core according to the present embodiment comprises a metal magnetic material and a resin, and is characterized in that fine particles exist on a surface of the dust core. When fine particles exist on a surface of the dust core, the dust core has an improved corrosion resistance.

Figure 1:
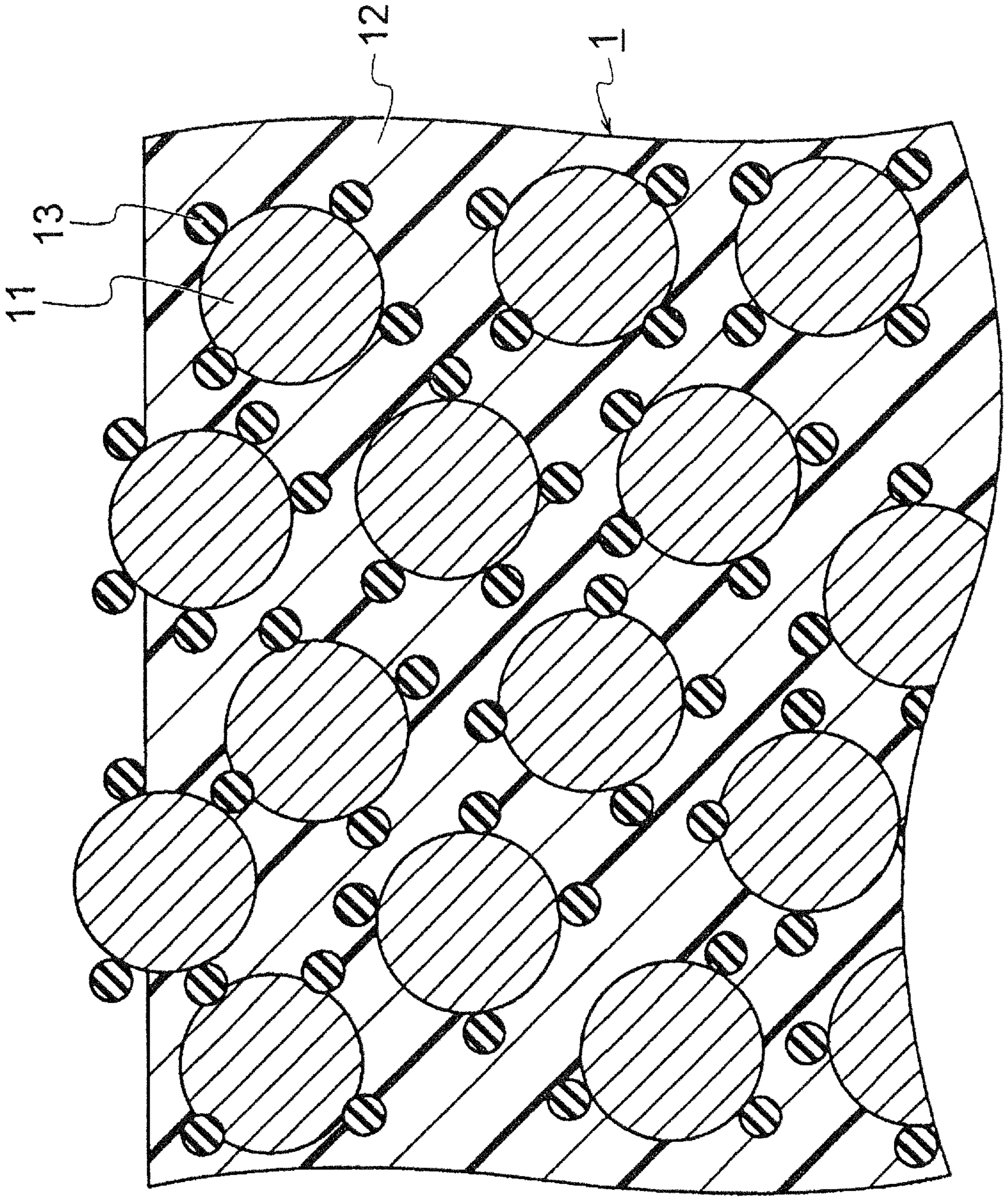
FIG. 1 is a schematic view of a cross section of a dust core according to an embodiment of the present invention.

As shown in FIG. 1, a dust core 1 according to the present embodiment includes a metal magnetic material 11 and a resin 12. Moreover, fine particles 13 are attached to a surface of the metal magnetic material 11. In the present embodiment, when an oxide film (not illustrated) mentioned below exists on the surface of the metal magnetic material 11, a case where the fine particles 13 are adhered to the oxide film is also included in a case where the fine particles 13 are adhered to the surface of the metal magnetic material 11.

The metal magnetic material 11 comprises any component, but preferably comprises a main component of Fe because high saturation magnetization is obtained. Preferably, the metal magnetic material 11 comprises a main component of Fe and Si because a high permeability is obtained. Incidentally, "comprising a main component" in the present embodiment means that an amount of the main component is 80 wt % or more in total provided that the amount of the entire metal magnetic material is 100 wt %. That is, when Fe is included as a main component, a Fe content is 80 wt % or more. When Fe and Si are included as a main component, a Fe content and a Si content are 80 wt % or more in total. Fe and Si may be included at any ratio, but Si/Fe=0/100 to 10/90 is preferably satisfied by weight ratio because high saturation magnetization is obtained. Incidentally, any other components other than the main component, such as Ni and Co, may be included in the metal magnetic material of the present embodiment.

The resin 12 may be any resin, such as epoxy resin of cresol novolac etc. and/or imide resin of bismaleimide etc.

Any amount of the metal magnetic material 11 and the resin 12 may be contained in the dust core 1. With respect to the whole of the dust core 1, the amount of the metal magnetic material 11 is preferably 90 wt % to 98 wt %, and the amount of the resin 12 is preferably 2 wt % to 10 wt %.

Moreover, the dust core 1 according to the present embodiment may comprise a lubricant. The lubricant may be any lubricant, such as zinc stearate.

As shown in FIG. 1, the dust core 1 according to the present embodiment is characterized in that the fine particles 13 are attached to the metal magnetic material 11. The fine particles 13 comprise any material, such as a Si—O based oxide. The Si—O based oxide may be any oxide, such as a Si oxide like $SiO_2$ and a composite oxide including Si and other elements.

In the dust core 1 according to the present embodiment, the fine particles 13 are attached to the metal magnetic material 11, and corrosion resistance is thereby improved. The present inventors consider that explained bellow is the mechanism where the fine particles 13 are adhered and present on the surface of the dust core 1 and the dust core 1 has an improved corrosion resistance.

The fine particles 13 are bonded to the metal magnetic material 11, and thereby exist on the surface or near the surface of the dust core 1 finally obtained. Then, nano-scale unevenness is generated on the surface of the dust core 1 due to the presence of the fine particles 13. The fact that nano-scale unevenness is generated on the surface of the dust core 1 can be confirmed by atomic force microscope (AFM). Then, the dust core 1 has an improved water repellency due to the generation of unevenness, and thereby has an improved corrosion resistance.

The fine particles 13 on the surface of the dust core 1 have any average particle size, and may have an average particle size of 0.5 to 247.3 nm, but preferably have an average particle size of 1.0 to 200 nm. When the fine particles 13 have an average particle size of 1.0 to 200 nm, the dust core 1 has an improved water repellency and has an improved corrosion resistance. Incidentally, the fine particles 13 may have an average particle size of 1.1 to 199.4 nm.

Figure 4:
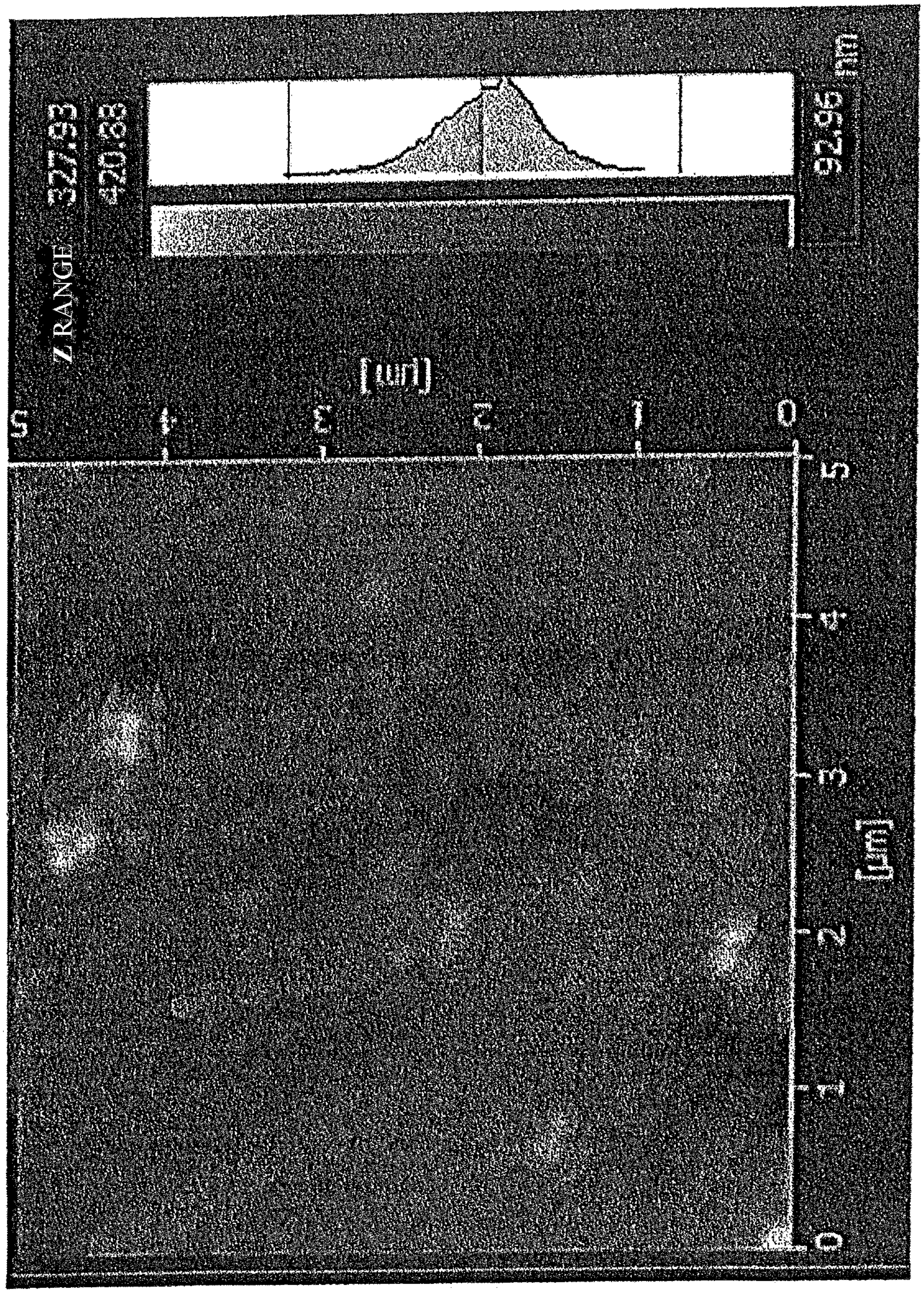
FIG. 4 is a photograph of a surface of a dust core observed by atomic force microscope.

Incidentally, the average particle size of the fine particles 13 on the surface of the dust core 1 can be measured by atomic force microscope (AFM). Specifically, the surface of the dust core 1 is firstly photographed by an atomic force microscope. FIG. 4 shows an example of an image of the surface of the dust core 1 photographed by an atomic force microscope. Next, selected randomly are at least five, preferably 10 or more, fine particles 13 on the surface of the dust core 1. Then, vicinities of 5 μm×5 μm around the selected particles are observed by an atomic force microscope. Observed are all particle sizes of the fine particles 13 present within the observation range of the resulting shape images. Specifically, an area of the fine particle 13 is obtained by image analysis, and a diameter of a circle having this area (circle equivalent diameter) is considered to be a particle size of the fine particle 13. Then, an arithmetic mean value calculated by (total value of particle sizes of fine particles 13)/(number of fine particles 13) is defined as an average particle size.

Moreover, particle sizes of the fine particles 13 on the surface of the dust core 1 preferably have a standard deviation σ of 30 nm or less. When particle sizes of the fine particles 13 on the surface of the dust core 1 have a standard deviation σ of 30 nm or less, corrosion resistance can be further improved.

Any amount of the fine particles 13 is contained. An area ratio of the fine particles 13 occupied on the surface of the dust core 1 may be 1 to 100%.

Incidentally, the metal magnetic material 11 on the surface of the dust core 1 preferably has an average particle size (D50) of 3 to 100 μm. A particle size of the metal magnetic material 11 can be measured by atomic force microscope (AFM). Specifically, the surface of the dust core 1 is firstly photographed by an atomic force microscope. FIG. 4 shows an example of an image of the surface of the dust core 1 photographed by an atomic force microscope. Next, selected randomly are at least five particles, preferably 10 particles or more, of the metal magnetic material 11 on the surface of the dust core 1. Then, measured are particle sizes of the selected particles of the metal magnetic material 11. Specifically, an area of the particle of the metal magnetic material 11 is obtained by image analysis, and a diameter of a circle having this area (circle equivalent diameter) is considered to be a particle size of the particle of the metal magnetic material 11. Then, an average particle size (D50) can be calculated from the measured particle sizes of the particles of the metal magnetic material 11.

A method of manufacturing a dust core 1 according to the present embodiment is described below, but the dust core 1 is not limited to being manufactured by the following method.

First, metal particles to be a metal magnetic material 11 are manufactured. The metal particles are manufactured by any method, such as gas atomization method and water atomization method. The metal particles have any particle size and any circularity, but their particle size preferably has a median (D50) of 1 μm to 100 μm because a high permeability is obtained.

Next, the metal magnetic material 11 is coated to form an oxide film comprising a Si—O based oxide. The metal magnetic material 11 is coated by any method, such as a method of applying an alkoxysilane solution to the metal magnetic material 11. The alkoxysilane solution is applied to the metal magnetic material 11 by any method, such as wet spray. The alkoxysilane solution is any kind, such as trimethoxysilane. The alkoxysilane solution has any concentration, but preferably has a concentration of 50 wt % to 95 wt %. The alkoxysilane solution has any solvent, such as water and ethanol.

The powder after wet spray is subjected to a first firing, and an oxide film comprising a Si—O based oxide is thereby formed. The first firing is carried out in a nitrogen atmosphere whose hydrogen partial pressure is 1 to 3%, and the atmosphere during heating becomes reducible. The heating treatment is carried out in the reducible atmosphere, and the oxide film thereby becomes an amorphous layer having a low Si crystallinity. The heating conditions may be 400° C. to 600° C. for 1 to 10 hours. Fine particles 13 finally obtained tend to have a larger average particle size as the hydrogen particle pressure is higher. Particle sizes of the fine particles 13 tend to have a smaller standard deviation σ as the heating time (firing time) is longer.

Next, a second firing is carried out so as to bond the fine particles 13 comprising a Si—O based oxide to the metal magnetic material 11. The second firing is carried out at 800° C. to 1200° C. for 10 to 30 hours in a nitrogen atmosphere whose oxygen partial pressure is 0.1 to 1%. This firing develops spheronization of the above-mentioned amorphous layer having a low Si crystallinity. As a result, an oxide film is generated on the surface of the metal magnetic material 11, and the fine particles 13 are generated and attached to the oxide film. The powder thus obtained is considered to be a "metal material with fine particles". The fine particles 13 tend to have a larger average particle size as the firing time is longer. The particle sizes of the fine particles 13 tend to have a smaller standard deviation σ as the oxygen partial pressure is lower.

Next, a resin solution is prepared. The resin solution may be added with a curing agent in addition to the above-mentioned epoxy resin and/or imide resin. The curing agent may be any agent, such as epichlorohydrin. The resin solution has any solvent, but preferably has a volatile solvent, such as acetone and ethanol. Preferably, a total concentration of the resin and the curing agent is 0.01 to 0.1 wt % with respect to 100 wt % of the whole of the resin solution.

Next, mixed are the metal material with fine particles and the resin solution, and granules are obtained by volatilizing the solvent of the resin solution. The resulting granules may be filled in a die as they are, but may be filled in a die after being sized. The resulting granules may be sized by any method, such as a method using a mesh whose mesh size is 45 to 500 μm.

Next, the resulting granules are filled in a die having a predetermined shape and are pressed, and a pressed powder is obtained. The granules are pressed at any pressure, such as 600 to 1500 MPa. The fine particles 13 also function as lubricants during the pressurizing. This makes it hard to peel the oxide film on the metal magnetic material 11 even on a sliding surface of the die. As a result, the fine particles remain on the surface of the dust core, and water repellency and corrosion resistance are thereby improved.

The manufactured pressed powder is subjected to a heat curing treatment, and a dust core is obtained. The heat curing treatment is carried out with any conditions. For example, the heat curing treatment is carried out at 150 to 220° C. for 1 to 10 hours. Moreover, the heat curing treatment is carried out in any atmosphere, such as air.

The dust core according to the present embodiment and a method of manufacturing it are described above, but the dust core and the method of manufacturing it of the present invention are not limited to the above-mentioned embodiment. For example, the fine particles may be attached by manufacturing the dust core with a normal method until the molding step and carrying out a chemical treatment against the surface of the dust core after the molding.

The dust core of the present invention is used for any purpose, such as for coil devices of inductors, choke coils, transformers, etc.

EXAMPLES

Hereinafter, the present invention is described based on more detailed examples, but is not limited thereto.

Experimental Example 1

As a metal magnetic material, manufactured were Fe—Si based alloy particles where Si/Fe=4.5/95.5 was satisfied by weight ratio and the total amount of Fe and Si was 99 wt %. Incidentally, the median (D50) of particle sizes of the Fe—Si based alloy particles was 30 μm.

Next, 2 wt % of an alkoxysilane solution was wet sprayed against 100 wt % of the metal magnetic material so as to form an oxide film comprising a Si—O based oxide on the metal magnetic material. Incidentally, the alkoxysilane solution was a 50 wt % solution of trimethoxysilane.

Here, the wet spray was carried out by 5 mL/min, and the whole amount of the alkoxysilane solution was applied.

A first firing was carried out for the powder after wet spray. The first firing was carried out at 600° C. for 0.5 hours to 3 hours in a nitrogen atmosphere whose hydrogen partial pressure was 1% to 3%. Incidentally, the conditions of the first firing were controlled so as to obtain average particle sizes of fine particles on a surface of a dust core to be finally obtained and standard deviations σ of their particles sizes shown in Table 1 and Table 2.

Next, a second firing was carried out so as to form fine particles comprising $SiO_2$. The second firing was carried out at 1000° C. for 10 hours to 30 hours in a nitrogen atmosphere whose oxygen partial pressure was 0.1% to 1%. Incidentally, the conditions of the second firing were controlled so as to obtain average particle sizes of fine particles on a surface of a dust core to be finally obtained and standard deviations σ of their particles sizes shown in Table 1 and Table 2.

Next, a resin solution was formed by mixing an epoxy resin, a curing agent, an imide resin, and an acetone. The epoxy resin was cresol novolac. The curing agent was epichlorohydrin. The imide resin was bismaleimide. Each of the components was mixed so that a weight ratio of the epoxy resin, the curing agent, and the imide resin was 96:3:1, and that a total of the epoxy resin, the curing agent, and the imide resin was 4 wt % with respect to 100 wt % of the whole of the resin solution.

The above-mentioned metal material with fine particles was mixed with the above-mentioned resin solution. Next, granules were obtained by volatilizing the acetone. Next, the granules were sized using a mesh whose mesh size was 355 μm. The resulting granules were filled in a toroidal die whose outer diameter was 17.5 mm and inner diameter was 11.0 mm and were pressed at 980 MPa, and a pressed powder was obtained. The granules were filled so that the weight of the pressed powder was 5 g. Next, a heat curing treatment was carried out by heating the resulting pressed powder at 200° C. for 5 hours in air, and a dust core was obtained. The amount of the resin mixed was determined so that the amount of the metal magnetic material was about 97 wt % with respect to 100 wt % of a dust core finally obtained. Incidentally, the required number of dust cores was prepared to conduct all of the following measurements.

The surfaces of the dust cores obtained were observed by an atomic force microscope (AFM5100II manufactured by Hitachi High-Tech Science Co., Ltd.). The scanning mode of the image was DFM, the sensing lever was SI-DF40P2, the scanning frequency was 0.3 Hz, the I gain was 0.1, the A gain was 0.0249, and the withdrawal distance was 20 nm by using the SIS mode. Randomly selected were 10 particles of the metal magnetic material on the surface of the dust core. Then, observed were vicinities of 5 μm×5 μm around the selected particles. Then, measured and averaged were particle sizes of all of the fine particles present in the observation range, and thereby calculated were average particle sizes of the fine particles on the surfaces of the dust cores. Moreover, standard deviations σ of particle sizes were calculated from the particle sizes of the fine particles obtained.

Next, a saltwater spray test was carried out for each of the dust cores so as to evaluate corrosion resistance thereof. The saltwater spray test was carried out in a saltwater spray test container of W900 mm, D600 mm, and H350 mm by 1.5±0.5 mL/h at 80 $cm^2$. With these conditions, the saltwater spray test was carried out at 35° C. for 24 hours. After the saltwater spray, a measurement section of 3 mm×3 mm was set at 10 points. Each of the measurement sections was photographed by a camera attached to an optical microscope (50 times magnification), and a rust area ratio was calculated at each of the measurement sections. Then, calculated was an average of the rust area ratios at the 10 measurement sections. An average of the rust area ratios of 15.0% or less was considered to be good. Then, an average of the rust area ratios of 10.0% or less was considered to be better, and an average of the rust area ratios of 5.0% or less was considered to be the best.

TABLE 1

| | first firing | | | second firing | | | fine particles | rust area |
|---|---|---|---|---|---|---|---|---|
| | firing temp. (° C.) | atmosphere | firing time (h) | firing temp. (° C.) | atmosphere | firing time (h) | average particle size (nm) | ratio (%) |
| Comp. Ex. 1 | — | — | — | — | — | — | 0 | 15.6 |
| Ex. 1 | 600 | H2-1% | 0.5 | 1000 | O2-1% | 0.5 | 0.5 | 13.1 |
| Ex. 2 | 600 | H2-1% | 0.5 | 1000 | O2-1% | 1.5 | 0.9 | 12.1 |
| Ex. 3 | 600 | H2-1% | 0.5 | 1000 | O2-1% | 3 | 1.1 | 9.5 |
| Ex. 4 | 600 | H2-1.5% | 0.5 | 1000 | O2-1% | 0.5 | 2.5 | 8.9 |
| Ex. 5 | 600 | H2-1.5% | 0.5 | 1000 | O2-1% | 1.5 | 5.1 | 8.3 |
| Ex. 6 | 600 | H2-1.5% | 0.5 | 1000 | O2-1% | 3 | 13.2 | 7.9 |
| Ex. 7 | 600 | H2-1.75% | 0.5 | 1000 | O2-1% | 0.5 | 20.5 | 8.1 |
| Ex. 8 | 600 | H2-1.75% | 0.5 | 1000 | O2-1% | 1.5 | 40.3 | 8.1 |
| Ex. 9 | 600 | H2-1.75% | 0.5 | 1000 | O2-1% | 3 | 50.1 | 8.6 |
| Ex. 10 | 600 | H2-2% | 0.5 | 1000 | O2-1% | 0.5 | 80.2 | 7.1 |
| Ex. 11 | 600 | H2-2% | 0.5 | 1000 | O2-1% | 1.5 | 93.1 | 6.5 |
| Ex. 12 | 600 | H2-2% | 0.5 | 1000 | O2-1% | 3 | 99.7 | 6.2 |
| Ex. 13 | 600 | H2-2.5% | 0.5 | 1000 | O2-1% | 0.5 | 102.3 | 7.3 |
| Ex. 14 | 600 | H2-2.5% | 0.5 | 1000 | O2-1% | 1.5 | 154.2 | 7.1 |
| Ex. 15 | 600 | H2-2.5% | 0.5 | 1000 | O2-1% | 3 | 189.2 | 8.8 |
| Ex. 16 | 600 | H2-3% | 0.5 | 1000 | O2-1% | 0.5 | 199.4 | 8.9 |
| Ex. 17 | 600 | H2-3% | 0.5 | 1000 | O2-1% | 1.5 | 205.6 | 11.5 |
| Ex. 18 | 600 | H2-3% | 0.5 | 1000 | O2-1% | 3 | 247.3 | 12.1 |

TABLE 2

| | first firing | | | second firing | | | fine particles | | rust area |
|---|---|---|---|---|---|---|---|---|---|
| | firing temp. (° C.) | atmosphere | firing time (h) | firing temp. (° C.) | atmosphere | firing time (h) | average particle size (nm) | standard deviation σ of particle sizes (nm) | ratio (%) |
| EX. 21 | 600 | H2-1.75% | 0.5 | 1000 | O2-1% | 1.5 | 40.3 | 51.3 | 8.1 |
| EX. 22 | 600 | H2-1.75% | 1 | 1000 | O2-1% | 1.5 | 42.1 | 42.1 | 7.8 |
| EX. 23 | 600 | H2-1.75% | 3 | 1000 | O2-1% | 1.5 | 41.5 | 31.4 | 6.4 |
| EX. 24 | 600 | H2-1.75% | 0.5 | 1000 | O2-0.5% | 1.5 | 38.9 | 29.8 | 4.7 |
| EX. 25 | 600 | H2-1.75% | 1 | 1000 | O2-0.5% | 1.5 | 40.3 | 25.4 | 4.1 |
| EX. 26 | 600 | H2-1.75% | 3 | 1000 | O2-0.5% | 1.5 | 40.2 | 21.4 | 4.1 |
| EX. 27 | 600 | H2-1.75% | 0.5 | 1000 | O2-0.3% | 1.5 | 39.7 | 18.2 | 3.9 |
| EX. 28 | 600 | H2-1.75% | 1 | 1000 | O2-0.3% | 1.5 | 38.7 | 15.1 | 3.6 |
| EX. 29 | 600 | H2-1.75% | 3 | 1000 | O2-0.3% | 1.5 | 39.3 | 10.7 | 3.1 |
| EX. 30 | 600 | H2-1.75% | 0.5 | 1000 | O2-0.1% | 1.5 | 41.3 | 9.5 | 3.5 |
| EX. 30a | 600 | H2-1.75% | 1 | 1000 | O2-0.1% | 1.5 | 40.9 | 7.4 | 3.2 |
| EX. 31 | 600 | H2-1.75% | 3 | 1000 | O2-0.1% | 1.5 | 40.1 | 5.1 | 3.7 |

Figure 2:
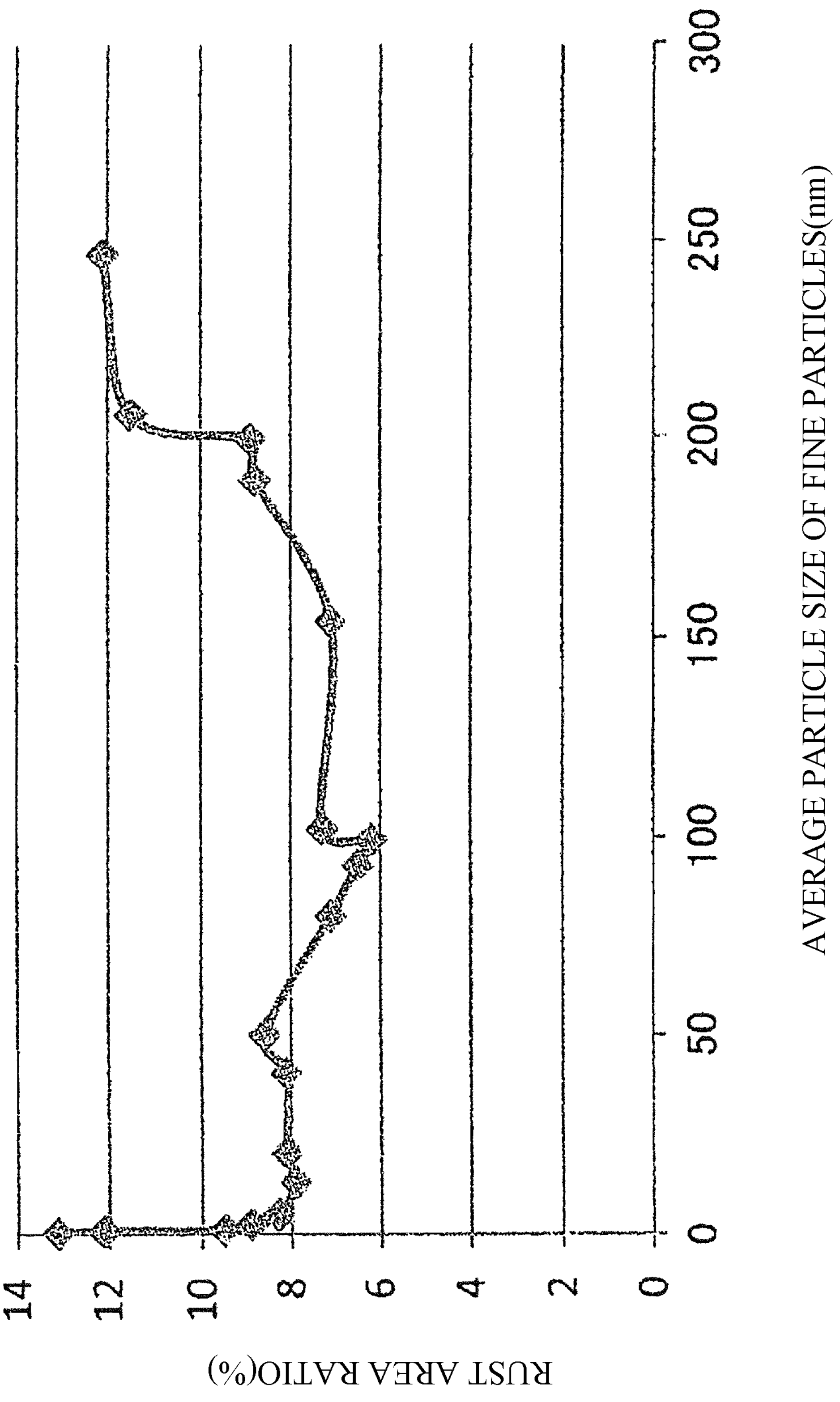
FIG. 2 is a graph showing a relation between average particle size of fine particles and rust area ratio in Examples of Table 1.

Examples 1 to 18 of Table 1 were an example where the average particle size of the fine particles was changed by changing firing time and firing atmosphere of the first firing and the second firing. FIG. 2 is a graph showing the results of Table 1.

The average particle sizes of the fine particles of Table 1 are values based on the above-mentioned definition of the average particle size. When the average particle size of the fine particles is larger than zero, fine particles are present on the surface of the dust core. In Table 1, the average particle size of the fine particles were larger than zero in all of Examples. That is, fine particles were present on the surface of the dust core in all of Examples of Table 1. According to Table 1, it is understood that all of Examples had a good corrosion resistance. In particular, Examples 3 to 16, where the average particle size of fine particles was 1.0 nm or more and 200 nm or less, had a better corrosion resistance than a corrosion resistance of Examples 1, 2, 17, and 18, where the average particle size of fine particles was out of the above range.

Figure 3:
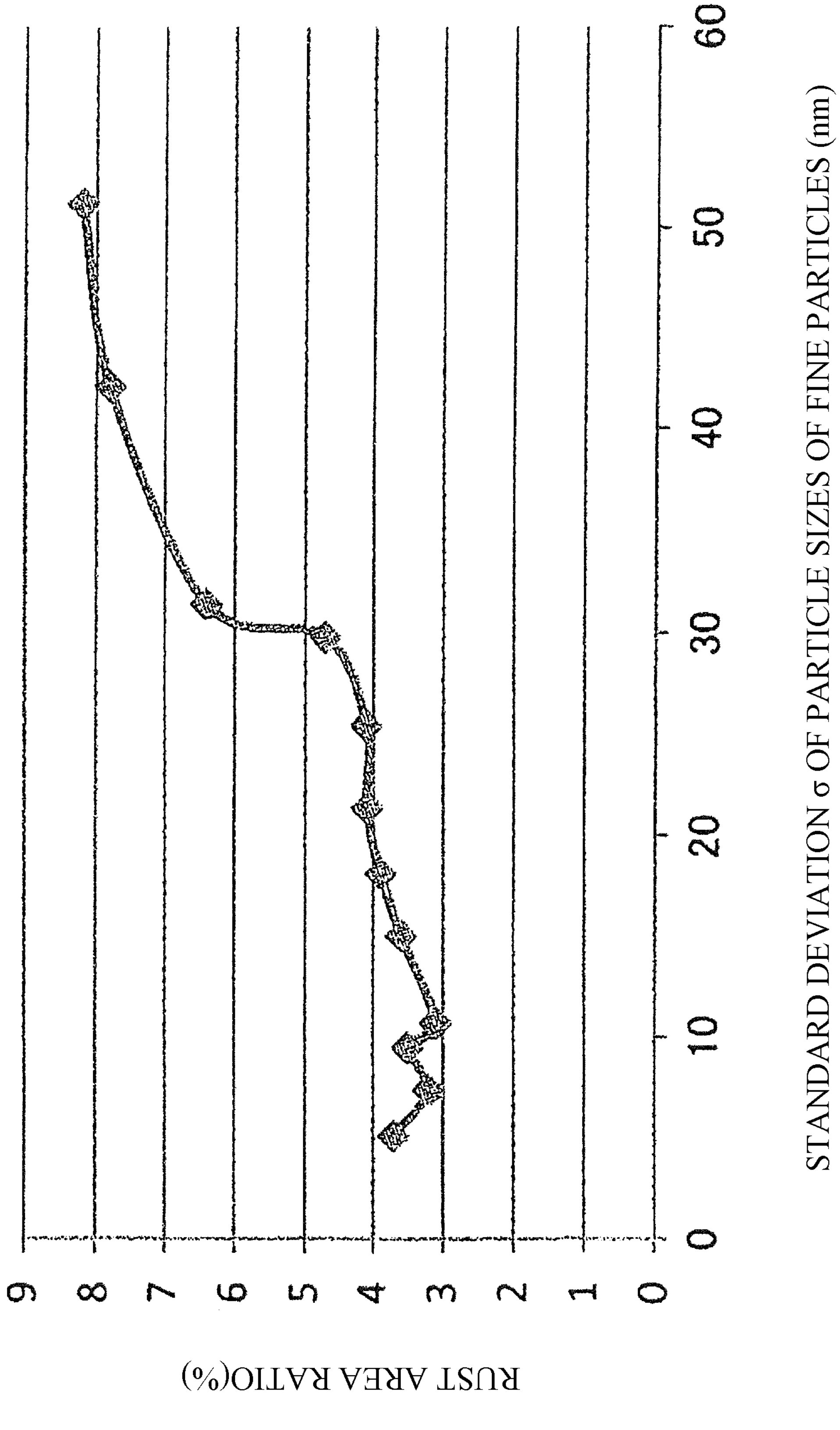
FIG. 3 is a graph showing a relation between standard deviation σ of particle sizes of fine particles and rust area ratio in Examples of Table 2.

Examples 21 to 31 of Table 2 were an example where the standard deviation σ of particle sizes of the fine particles was changed by changing the firing temperatures of the first firing and the second firing while the average particle size of the fine particles was controlled to around 40 nm. FIG. 3 is a graph showing the results of Table 2.

According to Table 2, it is understood that all of Examples had a good corrosion resistance. In particular, Examples 24 to 31, where the standard deviation σ of particle sizes of the fine particles was 30 nm or less, had a still better corrosion resistance, compared to Examples 21 to 23, where the standard deviation σ was more than 30 nm.

NUMERICAL REFERENCES

1 . . . dust core
11 . . . metal magnetic material
12 . . . resin
13 . . . fine particle

The invention claimed is:

1. A dust core comprising a metal magnetic material and a resin, wherein fine particles exist on a surface of the dust core, a film exists in contact with a surface of the metal magnetic material, the resin includes epoxy resin and/or imide resin, the film consists of a Si—O based oxide, and the metal magnetic material is present in an amount of 90 wt % to 98 wt %, and the resin is present in an amount of 2 wt % to 10 wt %, by weight of the dust core.

2. The dust core according to claim 1, wherein the fine particles comprise a Si—O based compound.

3. The dust core according to claim 1, wherein the fine particles are attached to the metal magnetic material.

4. The dust core according to claim 1, wherein the metal magnetic material comprises a main component of Fe.

5. The dust core according to claim 1, wherein the metal magnetic material comprises a main component of Fe and Si.

6. The dust core according to claim 1, wherein the fine particles are attached to the metal magnetic material, and the fine particles so attached are present in a matrix of the resin.

7. The dust core according to claim 1, wherein the fine particles on the surface of the dust core have an average particle size of 1.0 to 200 nm.

8. The dust core according to claim 7, wherein particle sizes of the fine particles on the surface of the dust core have a standard deviation a of 30 nm or less.

* * * * *